(12) United States Patent
Nagakura et al.

(10) Patent No.: US 7,349,030 B2
(45) Date of Patent: *Mar. 25, 2008

(54) SEGMENT BUFFER LOADING IN A DEINTERLACER

(75) Inventors: Clyde H. Nagakura, Los Gatos, CA (US); Qinggang Zhou, Campbell, CA (US); Thomas M. Chan, Saratoga, CA (US)

(73) Assignee: Darien K. Wallace, Brentwood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/586,297

(22) Filed: Oct. 24, 2006

(65) Prior Publication Data
US 2007/0040946 A1 Feb. 22, 2007

Related U.S. Application Data

(63) Continuation of application No. 10/722,323, filed on Nov. 25, 2003, now Pat. No. 7,136,108, which is a continuation-in-part of application No. 10/235,628, filed on Sep. 4, 2002.

(51) Int. Cl.
*H04N 7/01* (2006.01)
(52) U.S. Cl. .................................. 348/452; 348/458
(58) Field of Classification Search ............. 348/452, 348/441, 443, 446, 448, 451, 458, 553, 554; 382/171, 173; *H04N 7/01, 11/20*
See application file for complete search history.

(56) References Cited

U.S. PATENT DOCUMENTS

| | | | |
|---|---|---|---|
| 4,472,740 A | 9/1984 | Doi | 248/361 |
| 5,019,903 A | 5/1991 | Dougall et al. | 358/140 |
| 5,027,203 A | 6/1991 | Samad et al. | 348/441 |
| 5,093,721 A | 3/1992 | Rabii | 348/448 |
| 5,162,907 A | 11/1992 | Keating et al. | 375/240.16 |
| 5,241,281 A | 8/1993 | Wilkes et al. | 345/213 |
| 5,241,659 A | 8/1993 | Parulski et al. | 345/589 |
| 5,410,356 A | 4/1995 | Kikuchi et al. | 348/452 |

(Continued)

OTHER PUBLICATIONS

Internet pages from Pixelworks Inc. website www.pixelworksinc. com, first page entitled "PixelWorks Products", 3 pages, printed out Jun. 27, 2002.

(Continued)

*Primary Examiner*—Sherrie Hsia
(74) *Attorney, Agent, or Firm*—Imperium Patent Works; T. Lester Wallace (57) ABSTRACT

A display processor integrated circuit includes a display processor portion and an on-chip programmable logic portion. The programmable logic portion can be configured to implement custom video and/or image enhancement functions. The display processor portion performs block-based motion detection. If no motion is detected for a given block of pixels, then interline gaps in the block are filled using temporal interpolation. If motion is detected, then interline gaps are filled using spatial interpolation. To maintain accuracy without unduly increasing computational complexity, a less complex high angle spatial interpolation method is employed where a low angle tilt condition is not detected. A more computationally intensive low angle spatial interpolation method can therefore be employed in low angle tilt conditions. Integrated circuit cost is reduced by employing pipelining to write parts of segment buffers at the same time that other parts are being read to perform the interpolation process.

20 Claims, 9 Drawing Sheets

U.S. PATENT DOCUMENTS

| | | | |
|---|---|---|---|
| 5,428,397 A | 6/1995 | Lee et al. | 348/448 |
| 5,473,383 A | 12/1995 | Sezan et al. | 348/452 |
| 5,521,644 A | 5/1996 | Sezan et al. | 348/452 |
| 5,543,925 A | 8/1996 | Timmermans | 386/40 |
| 5,555,098 A | 9/1996 | Parulski | 386/104 |
| 5,642,262 A | 6/1997 | Terrill et al. | 361/783 |
| 5,682,205 A | 10/1997 | Sezan et al. | 348/452 |
| 5,689,305 A | 11/1997 | Ng et al. | 375/240.15 |
| 5,835,864 A | 11/1998 | Diehl et al. | 725/140 |
| 5,909,244 A | 6/1999 | Waxman et al. | 348/222.1 |
| 5,956,744 A | 9/1999 | Robertson et al. | 711/122 |
| 5,982,459 A | 11/1999 | Fandrianto et al. | 348/425.3 |
| 5,990,858 A | 11/1999 | Ozolins | 345/99 |
| 6,026,227 A | 2/2000 | Furtek et al. | 395/500.17 |
| 6,133,957 A | 10/2000 | Campbell | 348/458 |
| 6,166,773 A | 12/2000 | Greggain et al. | 348/448 |
| 6,175,390 B1 | 1/2001 | Kim et al. | 348/725 |
| 6,252,906 B1 | 6/2001 | Canfield | 375/240.21 |
| 6,339,434 B1 | 1/2002 | West et al. | 345/667 |
| 6,348,949 B1 | 2/2002 | McVeigh | 348/452 |
| 6,407,775 B1 * | 6/2002 | Frink et al. | 348/443 |
| 6,446,192 B1 | 9/2002 | Narasimhan et al. | 712/29 |
| 6,567,768 B1 | 5/2003 | Matos et al. | 702/187 |
| 6,577,345 B1 | 6/2003 | Lim et al. | 348/452 |
| 6,748,286 B1 | 6/2004 | Losch | 700/97 |
| 6,829,010 B1 | 12/2004 | Suzuki | 348/335 |
| 6,943,820 B2 | 9/2005 | Schmidt | 346/64 |
| 2001/0013123 A1 | 8/2001 | Freeman | 725/34 |
| 2002/0050518 A1 | 5/2002 | Roustaei | 235/454 |
| 2003/0025811 A1 | 2/2003 | Keelan et al. | 348/239 |
| 2003/0093806 A1 | 5/2003 | Dureau et al. | 725/107 |
| 2003/0121057 A1 | 6/2003 | Singh | 725/132 |
| 2003/0190157 A1 | 10/2003 | Aubry et al. | 386/124 |
| 2004/0100421 A1 | 5/2004 | Webb et al. | 345/10 |

OTHER PUBLICATIONS

Internet pages from of Genesis Microchip Inc. www.genesis-microchip.com, first page entitled Genesis Any Source—Any Display—gm6010 Digital TV Controller, 4 pages, downloaded Jun. 27, 2002.

Trident DPTV-iX Preliminary Product Brief from Trident Microsystems, Inc., 12 pages, dated Nov. 2001.

Genesis FLI2300 Digital Video Format Converter Product Brief from Genesis Microchip Inc., 2 pages, printed out Jun. 27, 2002.

Genesis gm6010 and gm6015 Product Brief from Genesis Microchip Inc., 2 pages, printed out Jun. 27, 2002.

U.S. Appl. No. 10/150,685, entitled "Distrubuted RAM In A Logic Array", 21 pages (and copy of filing receipt), filed May 17, 2002.

U.S. Appl. No. 10/164,455, entitled "Cell Architecture To Reduce Customization In A Semiconductor Device", 33 pages (and copy of filing receipt), filed Jun. 6, 2002.

NuCORE SiP-1250 Smart Image Processor product description by NuCORE Technology Inc., 2 pages, printed out Jul. 23, 2002.

* cited by examiner

SEGMENT LOADING SEQUENCE

FIG. 5

LAYOUT OF BLOCKS IN A FIELD

FIG. 6

BLOCKS IN A SEGMENT IN THE LEFT COLUMN

FIG. 7A

BLOCKS IN A SEGMENT IN THE MIDDLE COLUMN

FIG. 7B

BLOCKS IN A SEGMENT IN THE RIGHT COLUMN

IN A BLOCK:

$P_{i,j}$  IS A LUMINANCE VALUE AT THE ith ROW AND jth COLUMN IN A BLOCK OF FIELD (t-1)

$Q_{i,j}$  IS A LUMINANCE VALUE AT THE ith ROW AND jth COLUMN IN THE BLOCK AT THE SAME POSITION OF FIELD (t+1)

$i \in [0, \text{BLOCK\_WIDTH}]$ $j \in [0, \text{BLOCK\_HEIGHT}]$ $$\text{SUM} = \sum_{j=0}^{\text{BLOCK\_HEIGHT}-1} \sum_{i=0}^{\text{BLOCK\_WIDTH}-1} \frac{(P_{i,j} + Q_{i,j})}{2}$$

$$\text{DIFF} = \sum_{j=0}^{\text{BLOCK\_HEIGHT}} \sum_{i=0}^{\text{BLOCK\_WIDTH}} |P_{i,j} - Q_{i,j}|$$

```
IF ( DIFF > SUM * THRESHOLD_RATIO )
   THEN { THERE IS MOTION ;
          MOTION_SIGNAL = 1 ;
          USE SPATIAL INTERPOLATION RESULTS ; }
   ELSE { THERE IS NO MOTION ;
          MOTION_SIGNAL = 0 ;
          INTERPOLATE USING THE AVERAGE OF FIELD(t-1) AND FIELD(t+1) ; }
FINAL_RESULT = MOTION_SIGNAL | CORRESPONDENT MOTION HISTORY BIT ;
CORRESPONDENT MOTION HISTORY BIT = MOTION_SIGNAL ;
```

BLOCK-BASED MOTION DETECTION

$$\text{VERT\_GRAD} = \frac{A - D + 2*(B - E) + C - F}{4}$$

$$\text{HORI\_GRAD} = \frac{A - C + D - F}{2}$$

IF $\left(|\text{VERT\_GRAD}| + |\text{HORI\_GRAD}| < \text{THRESHOLD}\right)$ THEN $$X_L = \frac{B + E}{2} \quad ; \quad X_C = \frac{B + E}{2} \quad ;$$

ELSE IF $\left\{\left\{\frac{|\text{VERT\_GRAD}|}{|\text{HORI\_GRAD}|} > \text{TAN}(68°)\right\} \text{ OR } \left\{\frac{|\text{VERT\_GRAD}|}{|\text{HORI\_GRAD}|} < \text{TAN}(23°)\right\}\right\}$ THEN $$X_L = \frac{B + E}{2} \quad , \quad X_C = \frac{B + E}{2} \quad ;$$

ELSE IF $\left\{\frac{\text{VERT\_GRAD}}{\text{HORI\_GRAD}} < 0\right\}$ THEN (LEFT TILT):

WHERE $X_L$ IS LUMINANCE $X_C$ IS CHROMINANCE $$X_L = \frac{A + F}{2} \quad , \quad X_C = \frac{P + S}{2} \quad ;$$

ELSE (RIGHT TILT):

$$X_L = \frac{D + C}{2} \quad , \quad X_C = \frac{Q + R}{2} \quad ;$$

HIGH ANGLE SPATIAL INTERPOLATION

SEGMENT BUFFER LOADING IN A DEINTERLACER

CROSS REFERENCE TO RELATED APPLICATION

This application is a continuation of, and claims priority under 35 U.S.C. § 120 from, nonprovisional U.S. patent application Ser. No. 10/722,323 entitled "Segment Buffer Loading in a Deinterlacer," now U.S. Pat. No. 7,136,108 filed on Nov. 25, 2003, the subject matter of which is incorporated herein by reference. Application Ser. No. 10/722,323, in turn, is a continuation-in-part of U.S. patent application Ser. No. 10/235,628 entitled "Display Processor Integrated Circuit With On-Chip Programmable Logic For Implementing Custom Enhancement Functions," filed on Sep. 4, 2002, the subject matter of which is incorporated herein by reference.

TECHNICAL FIELD

This application relates to deinterlacing of video information.

BACKGROUND

Video information in some video formats is interlaced. In one format, an image is displayed by painting every other line of pixels on a display, and then coming back and painting the intervening lines of pixels. For example, the odd scan lines are painted on the screen one by one, and then the even scan lines are painted. The entire image is called a frame. The first set of lines is a first field, and the second set of lines is a second field. In an NTSC video signal, for example, a frame includes 480 lines of pixels, where each line includes 720 pixels. Each field contains 240 lines of pixels, where each line is 720 pixels.

It is sometimes desired to increase the amount of video information by increasing the number of pixels in each field from 240 lines to a complete 480 lines. This process, called deinterlacing, doubles the amount of pixel information.

One technique for deinterlacing is pixel-based motion detection. See, for example, U.S. Pat. Nos. 6,166,773 and 5,473,383. Typically, pixel-based motion detection involves estimating the existence of motion for every single pixel of the field. These estimates are based on the value of the pixel. In real video, an object is typically represented by a large number of pixels. Movement of objects usually appears as changes in a large group of pixels between video fields. As a result, the change of a single pixel between fields often correlates to changes of its neighboring pixels. This correlation is, however, generally not exploited in pixel-based motion detection. Secondly, pixel-based motion detection generally uses information from only a few intensity values around the pixel for which motion is being estimated. Most noises are, however, burst noises and pixel-based motion detection fails in burst noise situations. Moreover, in real video a few pixels may happen to be the same between video fields when objects with repetitive textures move. Pixel-based motion detection may fail in such situations because pixel values do not change between successive video fields.

Another technique is adaptive diagonal interpolation, sometimes called directional adaptive interpolation. See, for example, U.S. Pat. No. 6,133,957. Directional adaptive interpolation calculates differences of pixel pairs, selects the pair with the smallest difference, and interpolates these pixels. Unfortunately, some real video includes pixel patterns where there is more than one pixel pair with the smallest difference. Moreover, the pair with the smallest difference may not generate the best interpolation result.

U.S. Pat. No. 5,410,356 describes another technique where motion compensation is used for deinterlacing. In this technique, an image field is divided into blocks. For every block of interest, a motion estimation engine finds a group of pixels that best matches the block in a defined searching range. A displacement vector or motion vector is typically predicted that describes the spatial translation from the block to the matched group of pixels. New lines of pixels are interpolated using the block of interest and the matched group of pixels. Such motion compensation techniques often do not do a job of predicting motion for use in deinterlacers. In real video, objects can rotate, turn and deform into other shapes. Objects can occlude each other partially or completely. Using simple spatial displacement to detect this type of motion often results in poor decisions. Additionally, using a displacement vector to interpolate often does not adequately obtain accurate results for deinterlacing applications. Object movement cannot always be represented as an integer displacement vector. An object can move a distance to a fraction of a pixel, and the group of pixels corresponding to a block can be different from the block. Finding an accurate match in such a scenario is often difficult without a more noise-tolerant motion detection scheme. In addition to these problems, motion compensation is computationally complex. The cost of realizing a deinterlacer using this technique may be undesirably high. Pixel information is moved from a field memory to the interpolation circuitry using line buffers. The required memory bandwidth of the pixel storing memory is also generally high, which further increases system cost because higher performance memories need to be employed.

An improved deinterlacing method is sought that can be efficiently realized in hardware.

SUMMARY

A display processor integrated circuit (for example, for a television or for a digital camera) includes a display processor portion and an on-chip programmable logic portion. The on-chip programmable logic portion can be configured or programmed to implement custom video and/or image enhancement functions. The display processor portion performs block-based motion detection. Rather than attempting to match a block of pixels in one field with a corresponding block of pixels in a subsequent field as is often done in motion compensation, the block-based motion detection performed by the display processor integrated circuit generates a sum value and a difference value from pixel pairs in corresponding pixel locations in the block in the field preceding the field of interest and the field subsequent to the field of interest. If these sum and difference values have a predetermined relationship to one another, then the block is, in one particular embodiment, determined to exhibit the motion characteristic.

If the motion characteristic is not detected for a given block of pixels, then interline gaps in the block are filled using temporal interpolation. If, on the other hand, the motion characteristic is detected, then the interline gaps are filled using spatial interpolation. To maintain interpolation accuracy without unduly increasing complexity of the integrated circuit, a less computationally intensive high angle spatial interpolation method is employed where a low angle tilt condition is not detected. A more accurate but more computationally intensive low angle spatial interpolation method can therefore be advantageously employed to interpolation in low angle tilt conditions.

The integrated circuit is designed and is specially adapted for high volume and low production cost applications including, for example, the high volume consumer television market. Integrated circuit cost is reduced by reducing the cost of memories used to pass pixel data from a field memory to interpolation circuitry. In one embodiment, the memories include three segment buffers. A memory control block on the integrated circuit retrieves new pixels to be processed from the field memory and writes them into a part of a segment buffer at the same time that the interpolation circuitry is reading other pixels from other parts of the segment buffer. A certain amount of pipelining is therefore employed in the writing and reading of the segment buffer. This pipelining increases the overall proportion of the time that the memory control block is writing pixel data into the segment buffers. Because the segment buffers are receiving pixel data from the memory control block during a larger proportion of the time, the type of memory employed to realize the segment buffer can have relaxed memory access bandwidth requirements. This allows the overall cost of the integrated circuit to be reduced. Rather than reading entire 720-pixel scan lines out of the field memory to support the block-based motion detection and interpolation processes, smaller segments of scan lines are read out of the field memory. This reduces memory access bandwidth requirements on the field memory and therefore further reduces system cost. Moreover, reading segments of lines out of the field memory rather than entire scan lines reduces the amount of memory required to pass information from the field memory to the interpolation circuitry. This reduces system cost still further.

Multiple other advantageous aspects and embodiments are set forth in the detailed description below. This summary does not purport to define the invention. The invention is defined by the claims.

DETAILED DESCRIPTION

Figure 1:
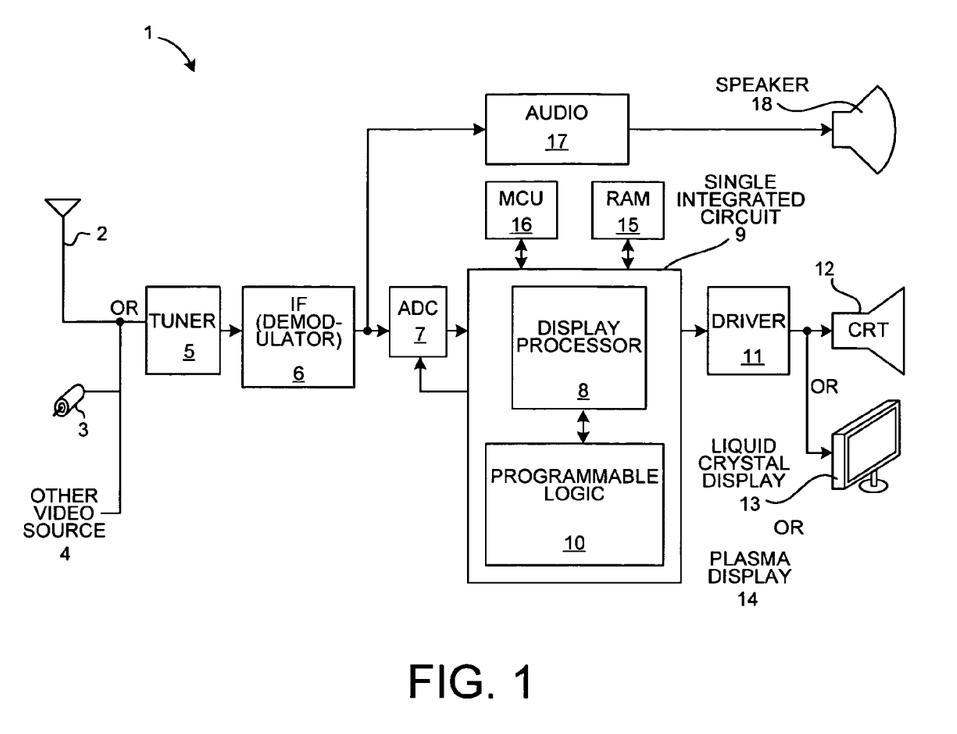
FIG. 1 is a simplified diagram of the electronics of a video display device in accordance with one embodiment of the present invention.

FIG. 1 is a simplified system level diagram of the electronics of a video display device 1 in accordance with one embodiment of the present invention. An incoming signal is received onto the video display device, for example, from an antenna 2, a coaxial cable 3, or another video source 4. The signal passes through a tuner 5, an IF demodulator 6, an analog-to-digital converter 7, and to a display processor 8 within an integrated circuit 9. The display processor 8 performs deinterlacing and scaling. A programmable logic portion 10 of integrated circuit 9, either independently or in concert with parts of the display processor 8, performs one or more enhancement functions. The resulting deinterlaced video signal is output from integrated circuit 9 to driver 11 and to a display device. The display device may, for example, be a cathode ray tube (CRT) 12, a liquid crystal display (LCD) screen 13, a plasma display 14 or other display device usable to view video. Frames of video information are stored in an external RAM 15. A microcontroller 16 is coupled to integrated circuit 9. Microcontroller 16 can control features and/or enhancement functions performed by integrated circuit 9. These features and/or enhancement functions may, for example, include Picture-In-Picture (PIP), Picture-Out-Picture (POP), Cinema 1, Cinema 2, format conversion, film detection, panorama scaling, alpha blending and overlay, VBI/Closed Captioning, On-Screen Display (OSD), and brightness adjusting. Audio passes through audio circuitry 17 and to speaker 18.

Figure 2:
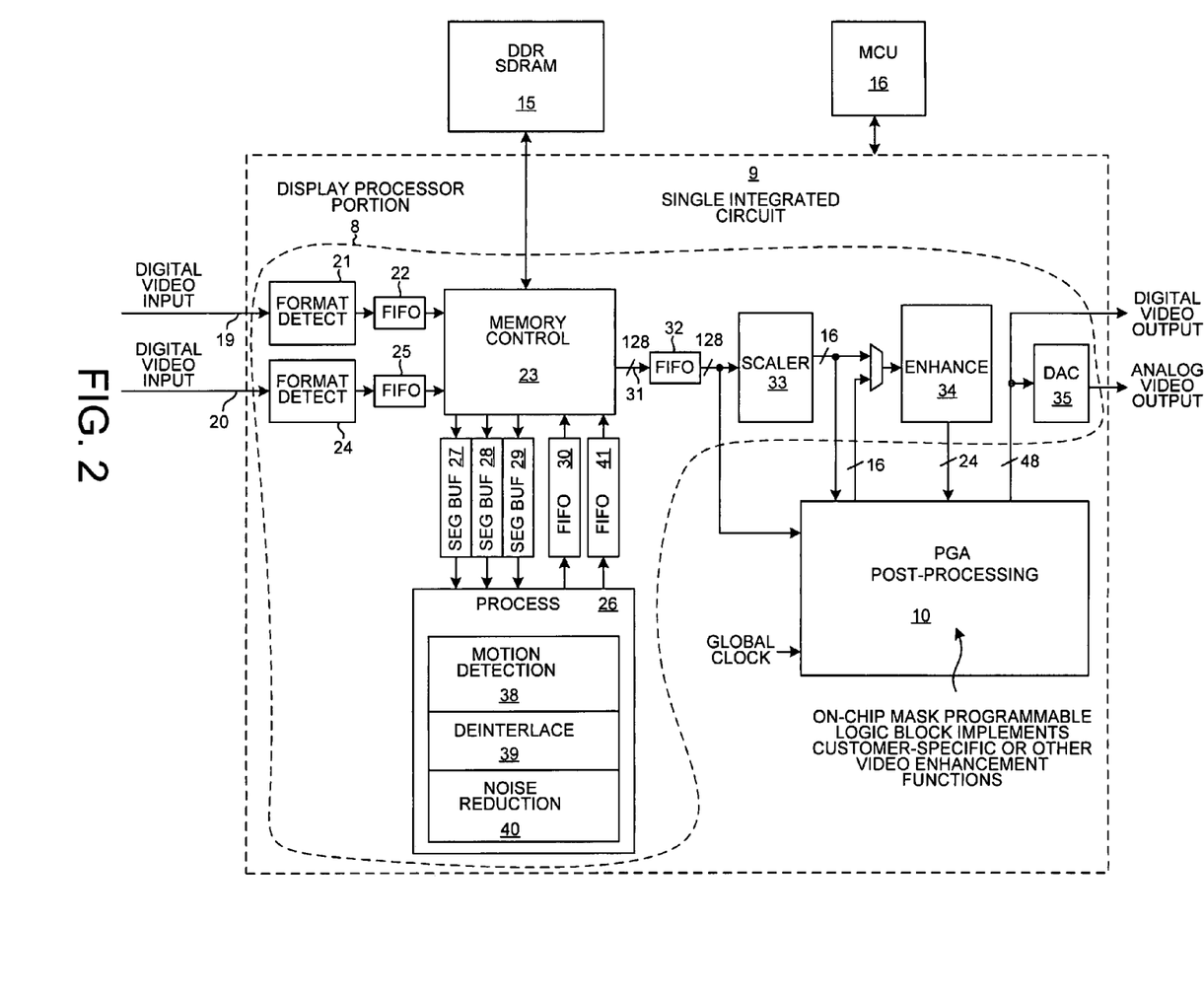
FIG. 2 is a simplified block diagram of the integrated circuit of the video display device of FIG. 1.

FIG. 2 is a more detailed diagram of integrated circuit 9 of FIG. 1. Integrated circuit 9 actually has two digital video input ports 19 and 20. A digital video signal received onto digital video port 19 passes through a format detector 21, through a FIFO 22, and to a memory control block 23. If a digital video signal is present on digital video port 20, then this second digital video signal passes through a second format detector 24, through a second FIFO 25, and to memory control block 23. In the example of FIG. 1, only one of the digital video ports, digital video port 19, is used. Consecutive frames of video pass through digital video input port 19, through format detector 21, through FIFO 22, through memory control block 23 and are stored in DDR SDRAM (double data rate synchronous dynamic random access memory) 15.

In one example, each frame of video is an NTSC video frame that includes 480 scan lines of pixels, where each row contains 720 pixels. (A line of pixels is sometimes called a row of pixels). In this example, a pixel involves two numbers: 1) an eight-bit luminance value, and 2) an eight-bit chrominance value. The chrominance value represents either red (chrominance red) color information or blue (chrominance blue) color information. Whether the chrominance value is for chrominance red or chrominance blue is determined by which pixel in the line it is. The chrominance values alternate, red and blue down the line. Whether the chrominance value is red or blue is determined by location of the pixel and is not encoded in the stored chrominance value.

Each frame is made up of two fields. The first field includes the odd scan lines of the frame. The second field includes the even scan lines of the frame. The first field includes pixels of the video image at a time before the remainder of the image represented by the pixels of the second field. In the example of the hardware of FIG. 2, consecutive fields of consecutive frames are received and stored field by field into RAM 15.

It is desired to supply some video display devices with "deinterlaced" video in that the number of pixels in each field of pixels is to be doubled. For each 240 line by 720 pixels field supplied to integrated circuit 9, the integrated circuit is to output a frame of 480 lines by 720 pixels. To convert a 240 line by 720 pixel field (called the "field of interest") into a 480 line by 720 frame, corresponding blocks of three consecutive fields are taken out of RAM 15.

Figure 3:
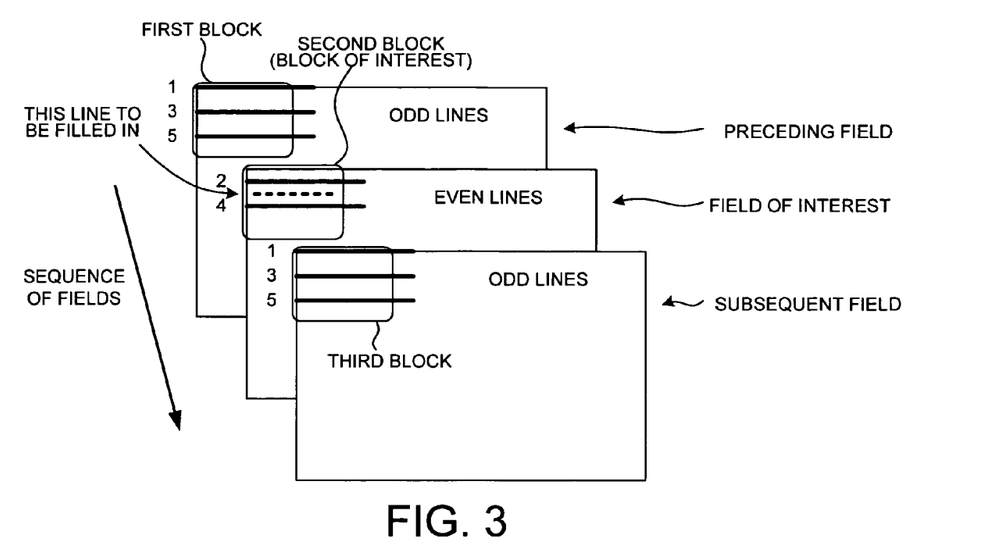
FIG. 3 is a simplified block diagram illustrating three consecutive fields of video.

FIG. 3 illustrates three such corresponding blocks in three consecutive fields. In this example, the first field contains odd lines for a first frame (lines 1, 3, 5 and so forth) and the second field contains even lines (lines 2, 4, 6 and so forth) for the first frame. The third field is the first field containing odd lines (lines 1, 3, 5 and so forth) of the next frame. The middle field is the field of interest. The second block for which extra pixels are to be generated is a block from this field of interest. The number of lines of pixels within this block is doubled. The first block is a block for the same spatial location in the frame as the second block, only the first block is from the field immediately prior to the field of interest. The third block is a block for the same spatial location in the frame as the second block, only the third block is from the field immediately following the field of interest. Motion detection block 38 of process block 26 (see FIG. 2) uses the first and the third blocks to make a determination whether there is motion in the second block. If, for example, an object in the video that happens to be in the area of the picture defined by a block were to move position from one field to the next to the next, then motion might be detected.

If motion is not detected for the area of the picture defined by the second block, then temporal interpolation is used to create pixels in between the row of pixels of the second block. In the example of FIG. 3 where the second block contains even lines, the temporal interpolation process generates new pixels in the odd rows such that the number of pixels in the second block is doubled. These new pixels are to fill in the interline gaps between the even lines. These new pixels are determined by looking at the corresponding pixels in the first block and third block. This is called "temporal" interpolation because pixel information outside the time of the field of interest (the second block is from the field of interest) is used to interpolate and determine the new pixels.

If, on the other hand, motion is detected within the second block, then spatial interpolation is used to interpolate and fill in the odd lines in the second block. Spatial interpolation uses pixels in the same field as the second block to determine the new pixels. In this way, block after block within the field of interest are filled in such a way that the number of lines of pixels in the field of interest is increased from 240 even lines to 480 odd and even lines. The interpolation and generation of new pixels is performed by deinterlace block 39 of process block 26 (see FIG. 2).

The method is explained in further detail in connection with FIGS. 4-12. The blocks of pixels used in the process described above are taken out of RAM 15 in multi-block "segments" of pixels. A segment of pixels is six lines high by 288 pixels wide, except for the segments in the top row of segments and the segments in the bottom row of segments. Segments in the top and bottom rows of segments are five lines high by 288 pixels wide.

Figure 4:
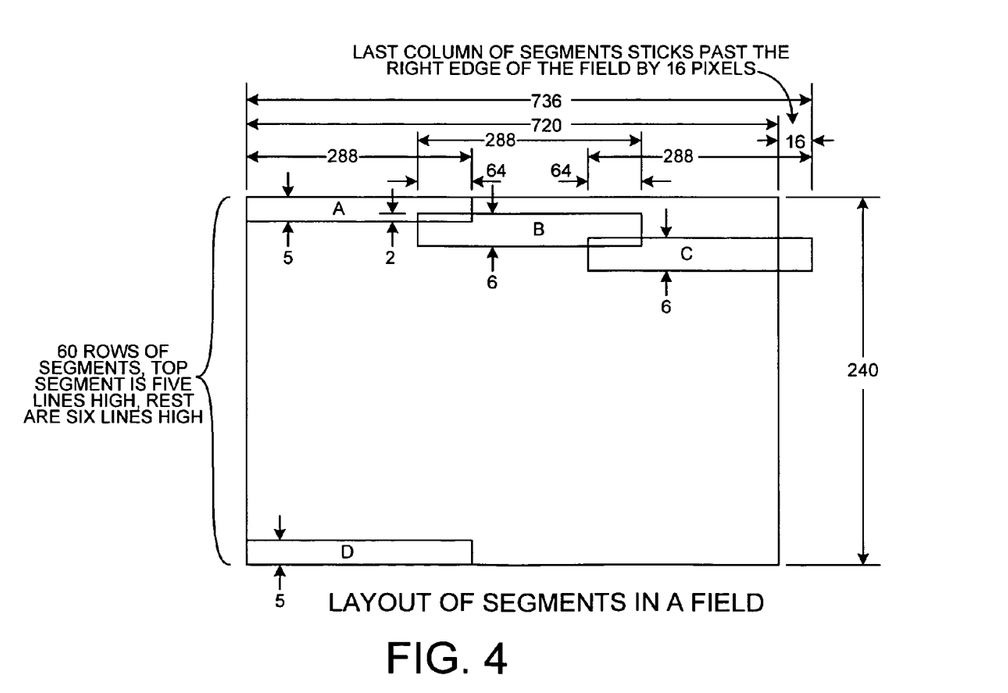
FIG. 4 is a simplified diagram illustrating the overlap of the segments of a field.

FIG. 4 illustrates four segments designated A, B, C and D. As illustrated, segment A is in the top row of segments. Segment A is five lines high by 288 pixels wide. Segment B, which is in the second row of segments, is six lines high by 288 pixels wide. Segment C, which is in the third row of segments, is six lines high by 288 pixels wide. Segment D, which is in the bottom row of segments, is five lines high by 288 pixels wide. There are three columns of segments. As illustrated in FIG. 4, the right portion of the leftmost column of segments overlaps the left portion of the middle column of segments by 64 pixels. Similarly, the right portion of the middle column of segments overlaps the left portion of the rightmost column of segments by 64 pixels. The last sixteen pixel positions of the segments in the rightmost column are not actually filled with pixel information because each scan line of pixels contains only 720 pixels.

Figure 5:
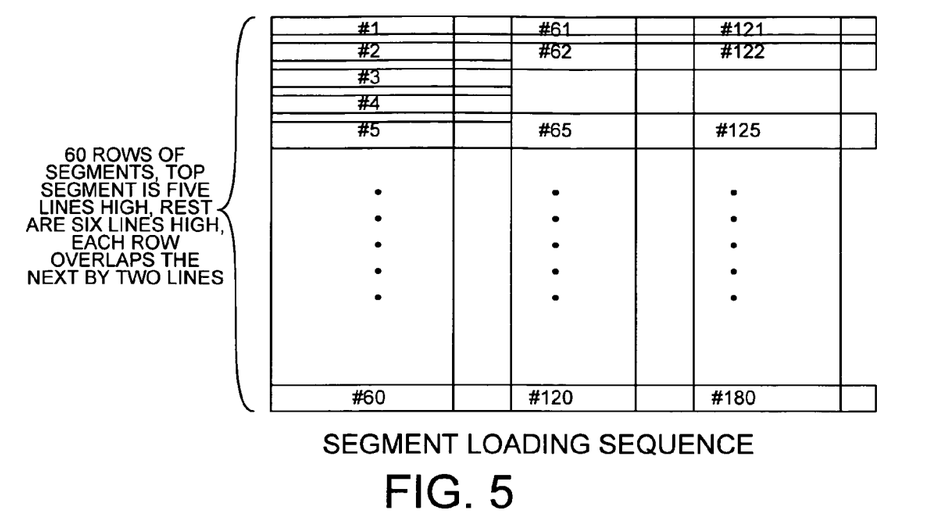
FIG. 5 is a simplified diagram illustrating a sequence in which the segments of a field are processed.

FIG. 5 illustrates how the various rows of segments overlap one another in the vertical dimension. As illustrated, there are sixty rows of segments. Each segment overlaps the segment below it by two lines of pixels. There are one hundred eighty total segments in a field. In FIG. 5, a segment number is preceded by a number sign #. The pixels of a field stored in RAM 15 are taken out of RAM 15 and are processed in the order illustrated in FIG. 5. The first segment of pixels to be taken out of RAM 15 and to be processed is denoted "#1", the second segment of pixels to be taken out of RAM 15 and to be processed is denoted "#2", and so forth.

Three segments of pixels, one from the field preceding the field of interest, one in the field of interest, and one following the field of interest, are taken out of RAM 15 by memory control block 23 (see FIG. 2), and are passed to a process block 26 via three respective segment buffers 27, 28 and 29. Each of segment buffers 27 and 29 is a buffer that stores six rows of 288 pixels each. Segment buffer 28 is smaller. It is a buffer that stores five rows of 288 pixels. Each of segments buffers 27, 28 and 29 is coupled to process block 26 by its own 128-bit wide bus.

As the blocks of the segment of the field of interest in segment buffer 28 are processed, the interpolated new pixels are written into a FIFO 30 (see FIG. 2). FIFO 30 is coupled to processor block 26 by a 128-bit wide bus. FIFO 30 is coupled to memory control block 23 by another 128-bit wide bus. Noise reduction results are output by noise reduction block 40 of process block 26 (see FIG. 2) and are supplied to memory control block 23 via FIFO 41.

Once the interpolation process is completed for all the blocks of the segment, then FIFO 30 contains all the newly interpolated pixels for the blocks in that segment. These blocks of newly interpolated pixels are stored by memory control block 23 in RAM 15. When the resulting field of "deinterlaced" video is to be output, then the segment of newly interpolated pixels is combined with the original segment and the resulting "deinterlaced" segment of blocks is output onto output bus 31 to FIFO 32. Each pixel is represented by 16 bits, and 8 pixels (all the pixels, both original and interpolated, in a column of the segment) are output onto bus 31 at the same time. Output bus 31 is therefore 128 bits wide. FIFO 32 contains 960 such 128-bit wide words.

The deinterlaced lines of video pass through FIFO 32, through scalar block 33, through PGA (Programmable Gate Array) block 10, and are output from integrated circuit 9. Each pixel is sixteen bits as it is output from scalar block 33. Pixels are output by scalar block 33 and are supplied to PGA block 10, pixel by pixel on a 16-bit bus. Numerous different PLD and FPGA architectures can be employed to realize PGA block 10. The use of the term FPGA architecture here describes the overall logic block and interconnect architecture and does not necessarily imply any particular configuration bit storage mechanism. PGA block 10 is to be factory-customized by the integrated circuit manufacturer or television manufacturer, and is not to be programmed in the "field" by an end-user of a television. In one example, PGA block 10 is customized so that it implements a customer-specific video enhancement function by changing just one mask. For details on one particular example of PGA block 10, see U.S. patent application Ser. No. 10/235,628, by Chan et al., entitled "Display Processor Integrated Circuit With On-Chip Programmable Logic For Implementing Custom Enhancement Functions," filed Sep. 4, 2002 (the subject matter of which is incorporated herein by reference).

The deinterlaced video may, or may not, pass through an enhancement block 34. Whether the deinterlaced video passes through enhancement block 34 is determined by PGA 10. An example of an enhancement performed by enhancement block 34 is brightness adjustment. Each pixel is 24 bits wide, and pixels come out of enhancement block 34 pixel by pixel on a 24-bit wide bus to PGA block 10. If an analog video output signal is desired, then the deinterlaced video stream passes through a digital-to-analog converter (DAC) block 35 and is output from integrated circuit 9 in analog form.

Figure 6:
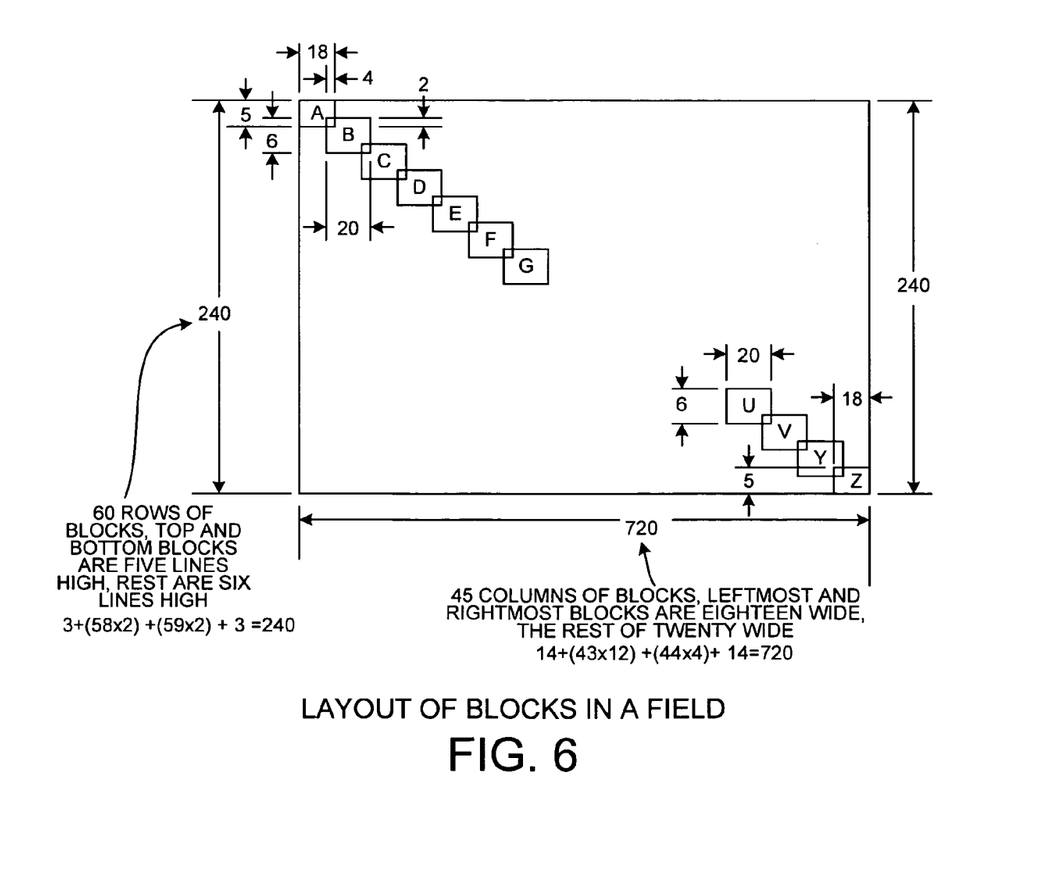
FIG. 6 is a simplified diagram illustrating the overlap of blocks of a field.

FIG. 6 illustrates how the blocks of pixels overlap one another in the vertical and horizontal dimensions. The top left block of pixels, designated in FIG. 6 as block A, is five pixel lines high as are all the other blocks of the top row of blocks. This block A is eighteen pixels wide, as are all the other blocks of the leftmost column of blocks.

The bottom right block of pixels, designated in FIG. 6 as block Z, is five pixel lines high as are all the other blocks of the bottom row of blocks. This block Z is eighteen pixels wide, as are all the other blocks of the rightmost column of blocks. All the other blocks of the field that are not in the top or bottom rows and are not in the leftmost or rightmost columns are six pixels high by twenty pixels wide. As illustrated, a block of pixels overlaps a block of pixels above it by two lines of pixels. As illustrated, a block of pixels overlaps a block of pixels to its right by four lines of pixels. Accordingly, it is seen that a 288-pixel wide segment of the leftmost column of segments (see FIG. 4) can store more pixels of information than are represented by the leftmost sixteen blocks of pixels.

Figure 7A:
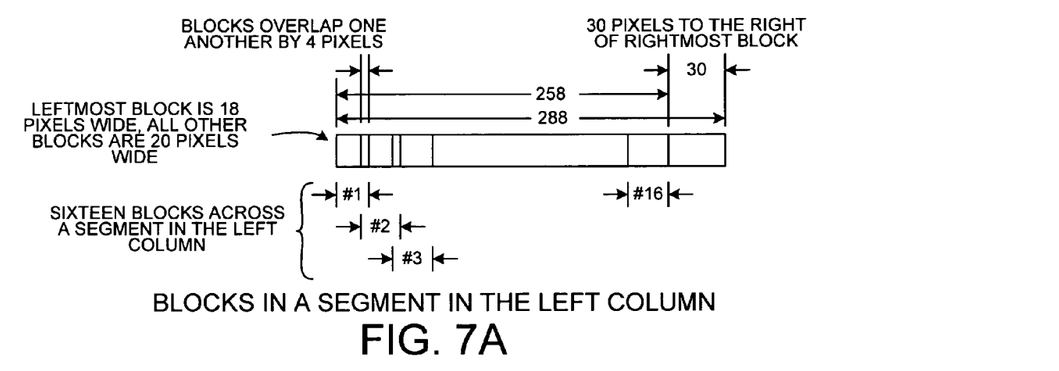
FIGS. 7A-7C illustrate where blocks are disposed in a segment in the leftmost column of segments, in the middle column of segments, and in the rightmost column of segments, respectively.

FIG. 7A illustrates how the pixels of the leftmost sixteen blocks of pixels are stored in a segment in the leftmost column of segments. As can be seen from FIG. 7A, although 288 pixels wide of information is read out of RAM 15, the rightmost thirty pixels are pixels to the right of the end of the sixteenth column of blocks. Any blocks of pixels in this last thirty columns of pixels are not processed with the other blocks of the segment, but rather are processed with the blocks of the next segment to the right.

Figure 7B:
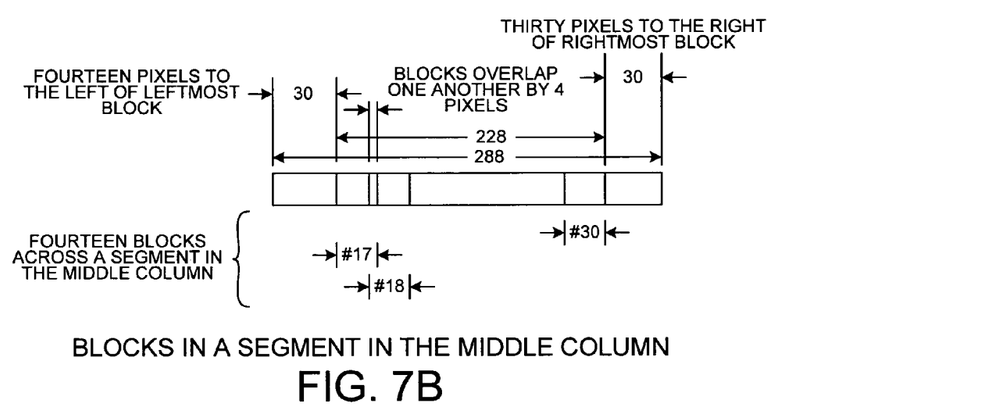

FIG. 7B illustrates how the pixels of block-columns seventeen through thirty are stored in the segment to the right of the segment of FIG. 7A. As illustrated, the leftmost thirty columns of pixels are to the left of block#17. Blocks of pixels in these leftmost thirty pixel columns have therefore been processed previously with the segment of FIG. 7A. The blocks of pixels to the left of block#17 are therefore not processed with block#17 through block#30 of the current segment. Similarly, blocks to the right of block#30 are not to be processed with the blocks of block-columns 17-30, but rather are to be processed with the segment to the right. There are thirty columns of pixels to the right of block#30.

Figure 7C:
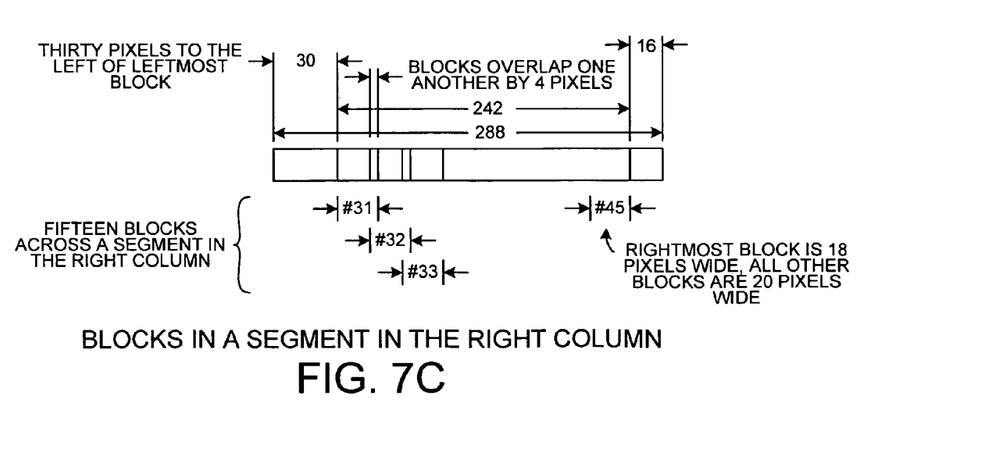

FIG. 7C illustrates how the blocks of the segment to the right are stored. As illustrated, blocks in the leftmost thirty columns of pixels are not processed because they were processed previously as blocks of the segment of FIG. 7B. Fifteen blocks (block#31 through block #45) are processed. The rightmost sixteen columns of pixels are located to the right of block#45. These columns of pixels do not store pixel information because these pixels are beyond the right edge of the frame.

Figure 8:
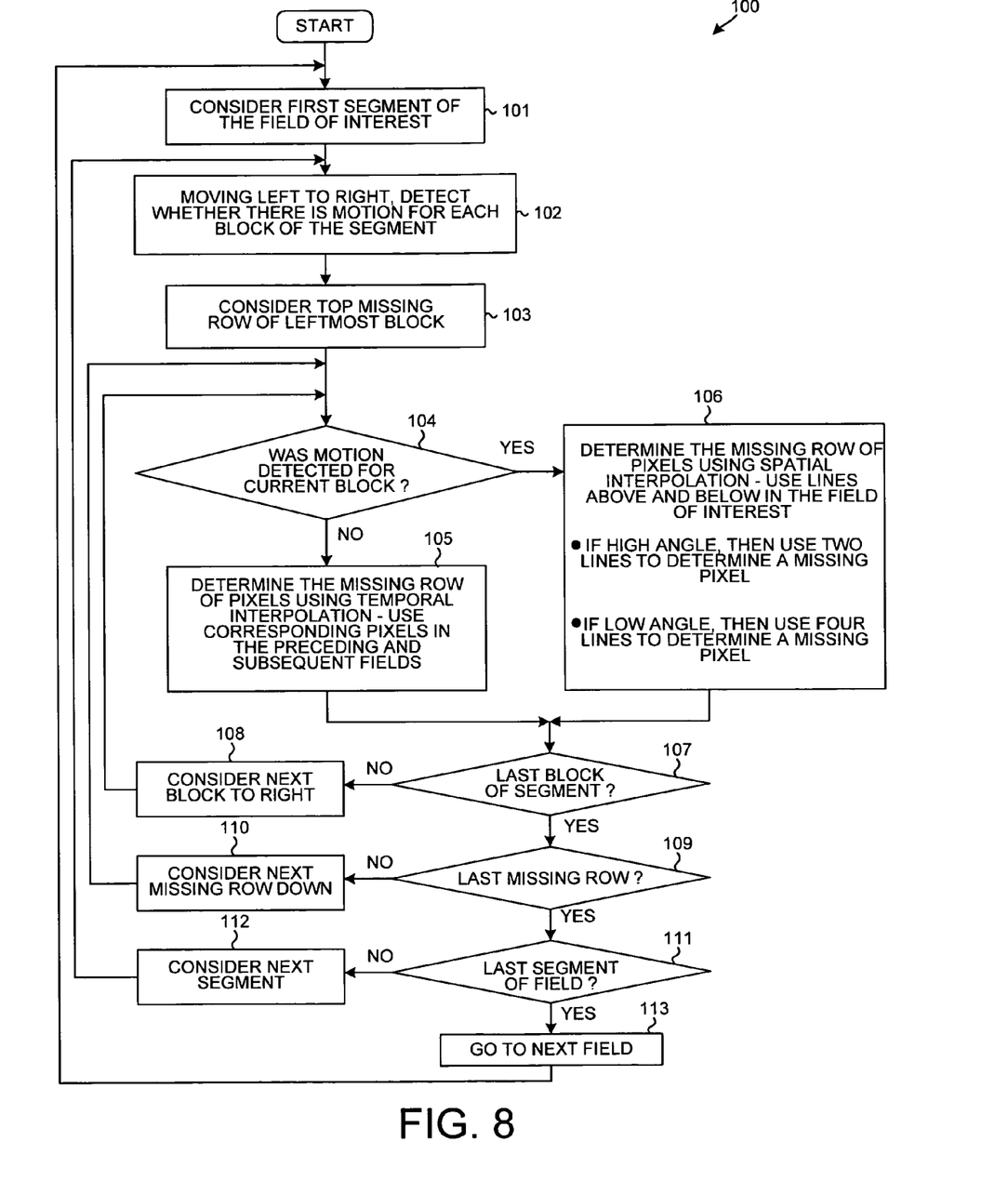
FIG. 8 is a simplified flowchart that sets forth a method in accordance with an embodiment of the present invention.
Figure 9:
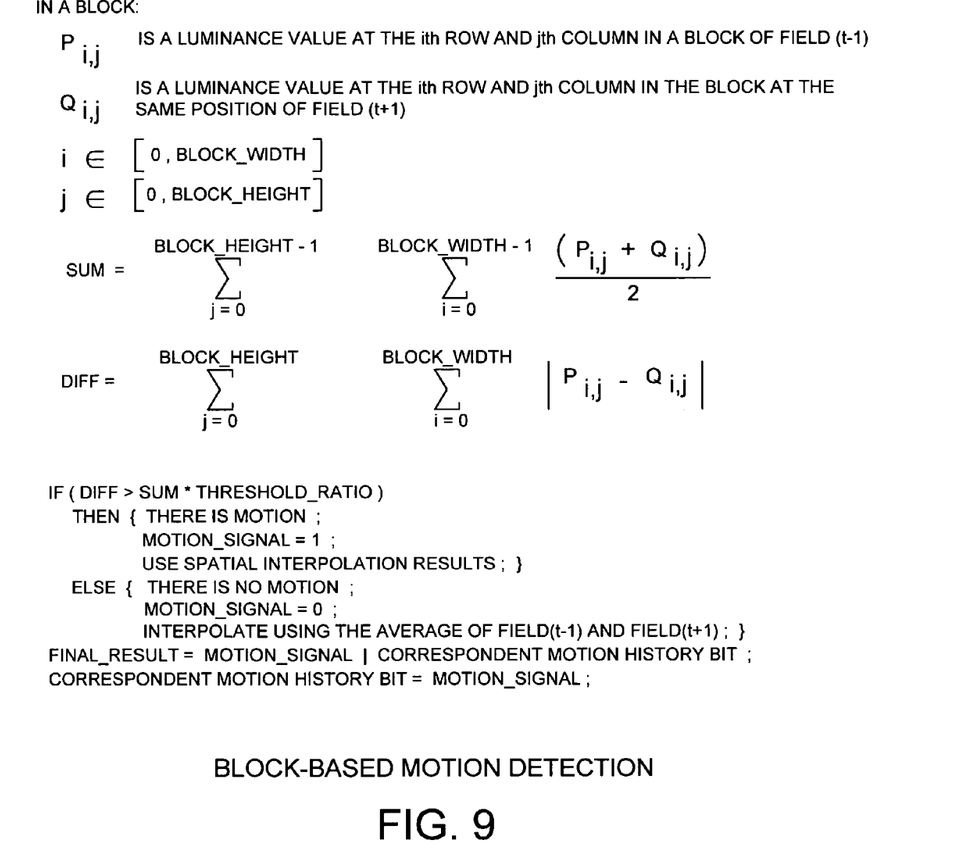
FIG. 9 is a diagram that sets forth details of the block-based motion detection step of the method of FIG. 8.

FIG. 8 illustrates a method 100 in accordance with the present invention. As set forth above in connection with FIG. 5, segments are processed one by one in the order indicated in FIG. 5. Accordingly, the first segment (segment#1) of the field of interest is loaded (step 101) into segment buffer 28. Moving block to block from left to right across the blocks of the segment, the decision (step 102) is made whether motion is detected for each block. One particular motion test is set forth in FIG. 9. In this motion test, the luminance values of each successive pair of corresponding pixels in the field immediately preceding the field of interest and corresponding pixel in the field immediately subsequent to the field of interest are averaged, and these averages are summed together for all the pixels of the block. This value is called "SUM" in FIG. 9. Similarly, the difference is taken of the luminance values of each successive pair of corresponding pixels in the field immediately preceding the field of interest and corresponding pixel in the field immediately subsequent to the field of interest, and these differences are summed together for all the pixels of the block. This value is called "DIFF" in FIG. 9. If DIFF is greater than the product of SUM and a threshold ratio, then the decision is made that the block exhibits motion.

The results of these motion detection tests are stored in a motion history buffer. Each bit in the motion history buffer represents whether motion has been detected for a corresponding block. In one example, the motion history buffer includes one bit for each block of the current segment. In another example, the motion history buffer is bigger and includes a bit for each block in the current field such that the motion history buffer contains an array of 45 by 60 bits, one bit for each of 45 by 60 blocks in a field.

After the results of the motion detection tests for an entire segment of blocks are stored in the motion history buffer, the leftmost block of the segment is considered (step 103). If no motion was detected for this block (step 104), then the upper row of missing pixels to be generated for the block are determined (step 105) using temporal interpolation. If, for example, a pixel in line three of the field of interest is to be determined (see FIG. 3), then the luminance value of the corresponding pixel from line three in the preceding field is averaged with the luminance value of the corresponding pixel from line three in the subsequent field. The resulting average is the generated pixel value. This pixel value is placed into line three in the segment in FIFO 30 (see FIG. 2). This process is repeated for each pixel to be generated in the row of pixels to be generated in the current block. The newly generated pixels are stored in FIFO 30.

If, on the other hand, motion was detected for the current block, then the upper row of pixels to be generated for the block is determined (step 106) using spatial interpolation. One of two types of spatial interpolation could be used to generate a particular pixel of interest, either high angle spatial interpolation or low angle spatial interpolation. A determination is made whether low angle spatial interpolation will be used (as explained further below in connection with low angle spatial interpolation). If this determination indicates that low angle spatial interpolation will not be used, then the pixel of interest is determined using high angle spatial interpolation. In this example, performing temporal interpolation in step 105 is less computationally intensive than performing spatial interpolation in step 106.

Figure 10:
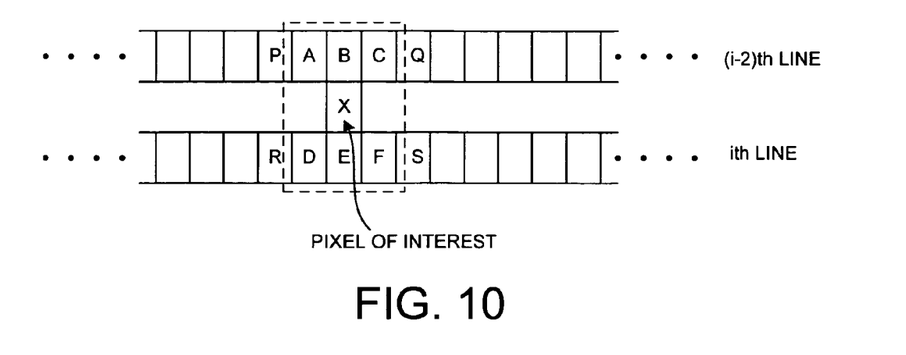
FIGS. 10 and 11 are diagrams that set forth how high angle spatial interpolation is performed.
Figure 11:
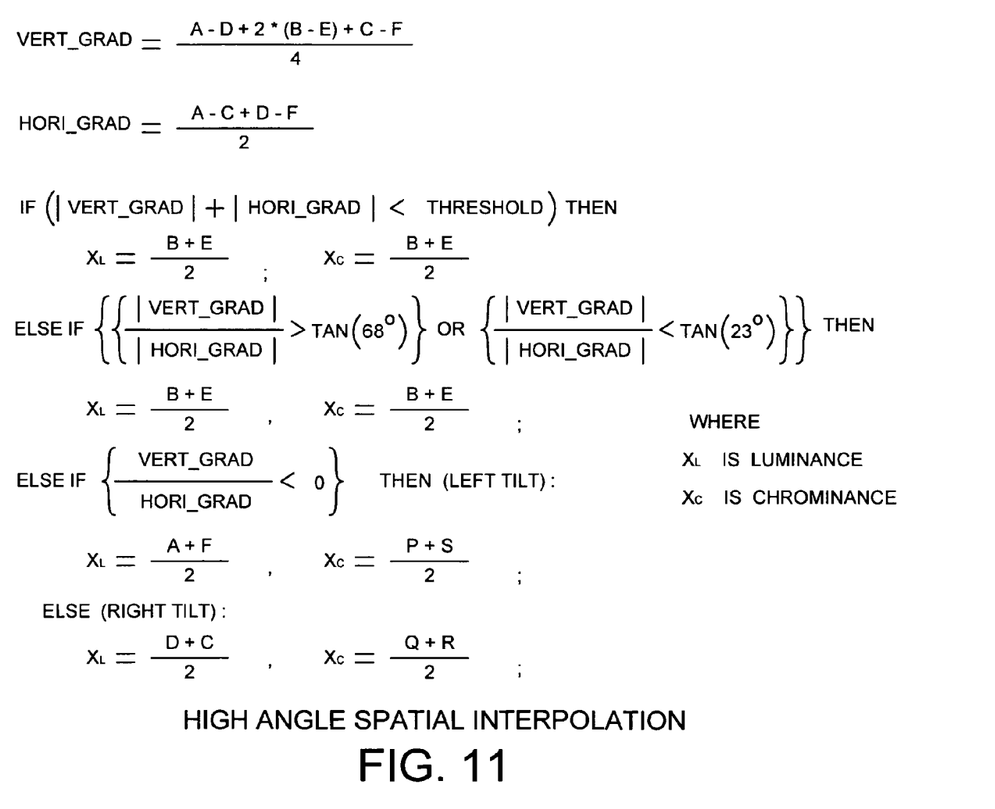

FIGS. 10 and 11 illustrate how high angle spatial interpolation is performed. In FIG. 10, the "X" represents the missing pixel to be generated. The pixel is in the (i−1)th line. In the example of the second block in the field of interest in FIG. 3, this pixel might be in line 3, for example. Pixels in the line above pixel X are designated pixels P, A, B, C and Q as illustrated. Pixels in the line below pixel X are designated pixels R, D, E, F and S as illustrated. Each pixel value includes an eight-bit chrominance value and an eight-bit luminance value. The luminance and chrominance values of pixel X are determined in accordance with the steps set forth in FIG. 11. The values A through F in the VERT_GRAD and HORI_GRAD equations are luminance values. For the other equations of FIGS. 10 and 11, pixels values used in luminance $X_L$ equations are luminance values, whereas pixel values used in chrominance $X_C$ equations are chrominance values.

The process of determining a pixel using low angle spatial interpolation involves three overall steps. First, a set of gradient values is determined. Second, the gradient values are examined to determine whether there exists in the gradients a pattern indicative of left tilt or a pattern indicative of right tilt. Third, either left tilt interpolation or right tilt interpolation is performed depending on whether the tilt detected is left tilt or right tilt.

Gradient values are determined by considering a group of pixels in a block. The group contains four rows of pixels, and where each row contains twenty-three pixels. The naming convention set forth in connection with FIG. 10 is employed to consider each set of six pixels. From one such set of six pixels, a gradient value X is determined for an interline gap pixel of interest. This gradient value X is determined in accordance with the equation A−D+2*(B−E)+C−F using luminance values of each of these pixels. If the result of this gradient calculation is greater than a predetermined threshold value, then the value X is determined to be a digital "1". If, on the other hand, the result of this calculation is less than the predetermined threshold value, then the value X is determined to be a digital "0". For each gradient value, a sign value is also stored where the sign bit indicates whether the gradient value is negative or positive. In this way, the template of six pixels A-F (see FIG. 10) is moved top to bottom down the leftmost three columns of the four rows of pixels in the block (the block is in the field of interest). This generates three gradient values for the leftmost three columns of pixels. This process repeats column by column to the right through the block, such that for every column, three gradient values are determined. Each gradient is stored with an associated sign value.

The successive sets of three gradients are examined to look for a first pattern. The first pattern involves at least four gradients in the top row of gradients being digital ones, but where the corresponding gradients below those in the next row down are all digital zeros, and the corresponding gradients below those in the next row down are all digital zeros. If such a first pattern of gradients is found, then more gradients are determined and examined to see if a second pattern exists to the right of the first pattern. The second pattern exists where number G of consecutive gradients in the top row of gradients are digital ones, where the G gradients below those in the next row down are all digital ones, and where the G gradients below those in the next row down are all digital zeros. Number G can be set to be, for example, minimum of two. If this second pattern is found, then more gradients are determined and examined to see if a third pattern exists to the right of the second pattern. This third pattern exists where number H consecutive gradients in the top row of gradients are all digital zeros, where the H gradients below those in the next row down are all digital ones, and where the H gradients below those in the next row down are all digital zeros. Number H can be set to be, for example, in the range of four to seventeen. If this pattern is found, then the number of consecutive ones in the second row of this pattern is stored. If this third pattern of gradients is found, then more gradients are determined and examined to see if a fourth pattern exists to the right of the third pattern. The fourth pattern exists where at least four consecutive gradients in the top row of gradients are digital zeros, where the corresponding gradients below those in the next row down are all digital zeros, but where the corresponding gradients below those in the next row down are all digital ones. If these four patterns are found in order from left to right in the set of gradients, and if all the digital ones have the same sign, then a determination is made that a "left tilt" exists. Left tilt luminance low angle spatial interpolation is performed by taking the number stored when the third pattern was detected, and dividing this number by two. If, for example, the number stored when the third pattern was detected was seven, then the result of dividing by two yields the value of three (plus a remainder which is discarded). The pixel in the row above the pixel of interest but three pixels to the left is averaged with the pixel in the row below the pixel of interest but three pixels to the right. This average is the left tilt luminance low angle spatial interpolation result.

If left tilt luminance low angle spatial interpolation is not performed, then the same process is repeated to look for the conditions of right tilt luminance low angle spatial interpolation. The first pattern to be looked for at the left of the set of gradients exists where at least four consecutive gradients in the top row of gradients are digital zeros, where the corresponding gradients below those in the next row down are all digital zeros, but where the corresponding gradients below those in the next row down are all digital ones. The second pattern to be looked for to the right of the first pattern exists where the number G consecutive gradients in the top row of gradients are digital zeros, where G gradients below those in the next row down are all digital ones, and where G gradients below those in the next row down are all digital zeros. Number G can be from 4 to 17. If this pattern is found, the number of consecutive ones in the second row of this pattern is stored. The third pattern to be looked for to the right of the second pattern exists where H consecutive gradients in the top row of gradients are digital ones, where H gradients below those in the next row down are all digital ones, and where H gradients below those in the next row down are all digital zeros. Number H can be set to, for example, minimum of two. The fourth pattern to be looked for to the right of the third pattern exists where at least four consecutive gradients in the top row of gradients are digital ones, where the corresponding gradients below those in the next row down are all digital zeros, and where the corresponding gradients below those in the next row down are all digital zeros. If these four patterns are detected, and if all gradient digital one values have the same sign, then right tilt luminance low angle spatial interpolation is performed. The number stored when the second pattern was detected is divided by two. If, for example, the number stored when the third pattern was detected was seven, then the result of dividing by two yields the value of three (plus a remainder which is discarded). The pixel in the row above the pixel of interest but three pixels to the right is averaged with the pixel in the row below the pixel of interest but three pixels to the left. This average is the right tilt luminance low angle spatial interpolation result.

Chrominance low angle spatial interpolation uses the same calculations as the chrominance high angle spatial interpolation set forth in FIG. 11. Left tilt chrominance low angle spatial interpolation is determined in accordance with $X_C=(P+S)/2$. Right tilt chrominance low angle spatial interpolation is determined in accordance with $X_C=(Q+R)/2$. The relative locations of pixels P, Q, R, S with respect to pixel X (the pixel of interest) is indicated in FIG. 10. The P, Q, R and S pixels values used are chrominance pixel values.

If the examination of gradient values results in neither left tilt nor right tilt low angle spatial interpolation being performed, then high angle spatial interpolation is performed. FIG. 11 illustrates how high angle spatial interpolation is performed.

Returning to the flowchart of FIG. 8, after the upper row of missing interline gap pixels has been generated for the current block (using either the temporal interpolation, or low angle spatial interpolation, or high angle spatial interpolation), then processing proceeds to decision block 107. If the block being processed is not the last block of the current segment (the rightmost block), then the next block to the right is considered (step 108). The upper row of missing interline gap pixels is determined (steps 104-106) for this next block, and the process continues until the last block (on the right edge) of the segment buffer is processed. In this way, the upper row of missing interline gap pixels is determined for each block of the current segment.

Once the upper row of missing interline gap pixels has been determined for the last block of the segment, a decision is made (step 109) whether the just generated row of interline gap pixels was the last such interline gap row to be generated for the segment. If it was not the last interline gap row, then the next row down of missing interline gap pixels is considered (step 110). The previous steps (steps 104-108) are used to fill in this next row of interline gap pixels for all the blocks of the segment. This process continues for each successive one of the missing rows of interline gap pixels.

When the last missing row (the bottom missing interline gap pixel row) of the last block of the segment (the rightmost block of the segment) has been created, then a decision (step 111) is made whether the segment just processed was the last segment of the field. If it was not, then the next segment is considered (step 112) and processing returns to step 102. In this manner, missing interline gap pixels are generated for each successive segment of the field of interest. The order of processing of segments is as set forth in FIG. 5.

Once the last segment has been processed, then processing goes to (step 113 of FIG. 8) the next field and the process repeats. Accordingly, the number of pixels in the field is increased from 240 scan lines of 720 pixels each, to 480 scan lines of 720 pixels each. The newly generated pixels are placed into FIFO 30.

Pipelined Segment Buffer Loading:

As set forth above in connection with FIG. 8, a decision (step 102) is made for each block of a segment whether motion has been detected. Then, after this decision has been made for all the blocks of the segment, the first missing row of pixels is generated for each of the blocks of the segment. Then the next missing row of pixels is generated for each of the blocks of the segment. In this manner, rows of missing pixels are generated, row by row, from top to bottom. The high angle interpolation uses one pixel above the pixel to be generated and one pixel below the pixel to be generated. The low angle interpolation uses pixels in two rows above the pixel to be generated and pixels in two rows below the pixel to be generated. Accordingly, once the second row of missing interline gap pixels has been generated for the blocks of the current segment, the top row of original pixels of the segment is no longer required for the generation of new pixels. This is true regardless of whether low angle spatial interpolation is used or not.

Accordingly, once the second row of missing interline gap pixels has been generated for the blocks of the current segment, memory control block 23 overwrites the upper line of original pixels in segment buffers 27 and 29 with a new line of pixels with the upper line of original pixels in the next segment to be processed. Similarly, the first row of pixels in segment buffer 28 can be overwritten with a new line of pixels in the first row of the next segment to be processed.

Then again, once the third row of missing interline gap pixels has been generated for the blocks in the current segment, then memory control block 23 overwrites the second line of original pixels in the current segment buffer 27 and 29 with the second line of pixels for the next segment to be processed. Similarly, the second row of pixels in segment buffer 28 is overwritten with a new line of pixels in the second row of pixels of the next segment to be processed.

This manner of pipelined loading of segment buffers 27, 28 and 29 (the overwriting of just used but no longer needed pixel data with new lines of pixel data at the same time that other pixel data is being read out of the segment buffers and is being used to perform interpolation) reduces memory bandwidth requirements of the external memory bus and allows a lower operating frequency of the memory control block 23 and the external memory block 15. This eases design requirements on memory control block 23 and reduces system cost by allowing the use of low cost, low performance external DRAMs. Segment buffers 27-29 are dual-port memories so that memory control block 23 can write original pixel data into the segment buffers at the same time that process block 26 reads pixel data out of the segment buffers.

Boundary Conditions:

Where the block of interest is in the upper line of blocks of an even field, the above method is not performed. Rather, a pixel in this top line of such a block is generated by averaging a corresponding pixel in the immediately preceding field and in the immediately following field. This is done for each pixel in line number one at the top of the field, regardless of whether motion is detected or not.

Similarly, where the block of interest is in the bottom row of blocks of an odd field, the above method is not performed. Rather, a pixel in the bottom line of such a block is generated by averaging a corresponding pixel in the immediately preceding field and in the immediately following field. This is done for each pixel in line number 480 at the bottom of the field, regardless of whether motion is detected or not.

Where the block of interest is at the left edge of the field and the pixel to be generated is at the left edge of the block, then temporal interpolation is always used, regardless of whether motion is detected or not. Similarly, if the block of interest is at the right edge of the field and the pixel to be generated is at the right edge of the block, then temporal interpolation is always used, regardless of whether motion is detected or not.

As set forth above, low angle spatial interpolation requires pixels in two lines above the pixel to be generated as well as pixels in the two lines below the pixel to be generated. Accordingly, low angle spatial interpolation cannot be performed to generate pixels in the upper row of pixels to be generated in a block. Similarly, low angle spatial interpolation cannot be performed to generate pixels in the bottom row of pixels to be generated in a block. Low angle spatial interpolation also requires pixels in two columns of pixels to the left of the pixel to be generated as well as pixels in two columns of pixels to the right of the pixel to be generated. Accordingly low angle spatial interpolation cannot be performed to generate pixels in the leftmost two columns of pixels of a block, nor in the rightmost two columns of pixels of a block.

As set forth above, high angle spatial interpolation requires pixels in the column to the left of the pixel to be generated. Accordingly, high angle spatial interpolation is therefore not performed to generate pixels in the leftmost column of pixels of the block. Similarly, high angle spatial interpolation requires pixels in the column to the right of the pixel to be generated. Accordingly, high angle spatial interpolation is not performed to generate pixels in the rightmost column of pixels of the block.

In the boundary situations above, if low angle spatial interpolation is otherwise called for but cannot be performed due to a boundary condition, then high angle spatial interpolation is used. If one of low or high angle spatial interpolation is called for but neither type of spatial interpolation can be performed due to a boundary condition, then temporal interpolation is used.

Figure 12:
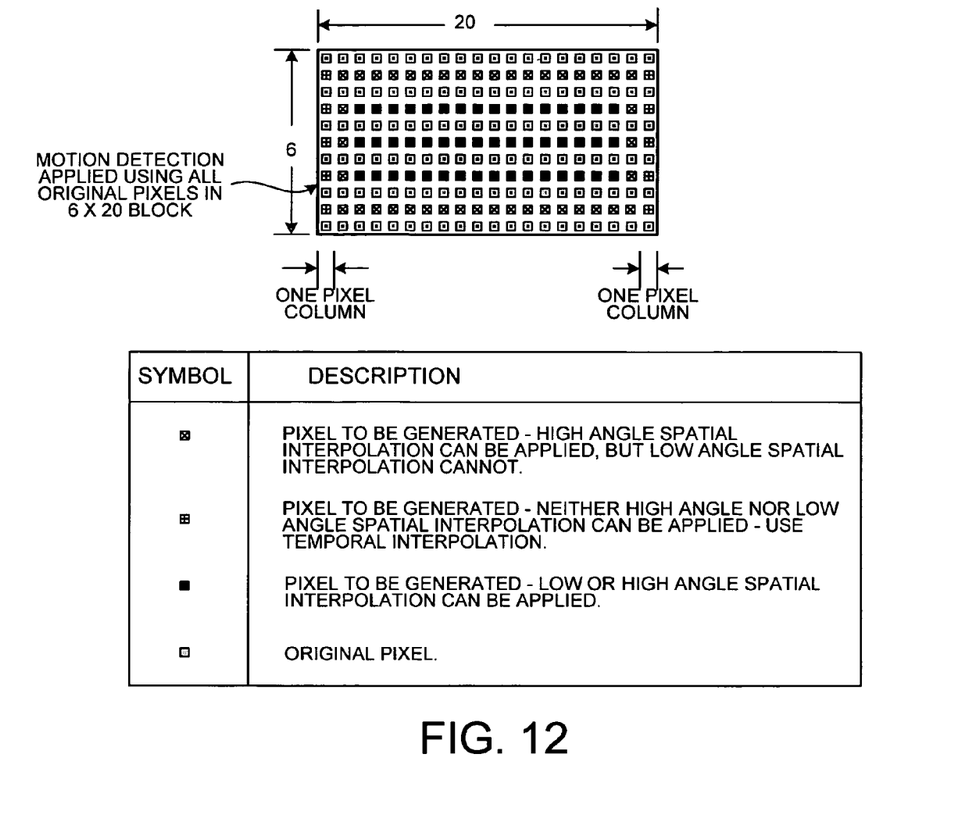
FIG. 12 is a diagram of a segment that shows which pixels to be generated are generated using interpolation, and which pixels to be generated are not generated by interpolation.

FIG. 12 illustrates the pixels of a block. The block is twenty pixels wide and includes six rows of original pixels. The six rows of original pixels are illustrated, as are the five rows of interline gap pixels to be generated. Which pixels to be generated that cannot be generated by high angle and low angle spatial interpolation are designated.

Although the present invention is described in connection with certain specific embodiments for instructional purposes, the present invention is not limited thereto. Although the motion detection block 38, the deinterlacer block 39 and the noise reduction block 40 are illustrated as separate blocks of circuitry in FIG. 2, the functionality of these blocks need not be so separated. The motion detection and deinterlacing blocks of the process block 26 of FIG. 2 can, in one embodiment, be embodied by describing the functionality of the motion detection and deinterlacing blocks in Verilog or another hardware description language, and then using commercially available hardware synthesis software to generate hardware that realizes the function in integrated circuit form. In such an embodiment, the motion detection and deinterlacing circuitry would likely be highly intermixed and would not be readily recognizable as separate blocks of circuitry. Memory access bandwidth requirements on the memories used to pass pixel data from the field memory to the interpolation circuitry can be reduced in ways other than by writing new pixel data into one part of a segment buffer at the same time that other pixel information in the segment buffer is being accessed by the interpolation circuitry. A pair of ping-pong segment buffers may, for example, be used such that the memory control block writes new pixel data into a first segment buffer at the same time that the interpolation circuitry uses pixel data in a second segment buffer. When the interpolation circuitry has examined all the pixel data in the second segment buffer, then memory control block starts writing new pixel data into the second segment buffer and the interpolation circuitry starts examining pixel data in the first segment buffer. In this way, the uses of the two segment buffers switch in a ping-pong manner. Other known techniques for decreasing memory access bandwidth requirements can be used. Although the spatial interpolation methods set forth above interpolate using pixel data from only one field (the field of interest), this need not be the case. A spatial interpolation method may also use a relatively small amount of pixel data from other fields and still be a spatial interpolation method. Similarly, a temporal interpolation method may use a relatively small amount of pixel data from pixels in the field of interest around the missing pixel being interpolated and still be a temporal interpolation method. The block-based motion detection determination may, in some embodiment, determine the relative amounts of spatial and temporal interpolation performed.

In some embodiments, PGA block 10 interfaces to the memory control block 23 such that PGA block 10 accesses portions of the fields of pixels in RAM 15 that are not being used by the other blocks of FIG. 2. Memory control block 23 may, for example, involve a microcoded DMA state machine that receives and executes DMA commands from a microcode control store. In ordinary operation, the DMA state machine executes DMA commands such that the DMA state machine carries out the loading of segment buffers 27-29 as set forth in the description of interpolation above. PGA block 10 is, however, also able to write DMA commands to a part of the microcode control store, thereby allowing PGA block 10 to cause a DMA transfer of an amount of pixel data from RAM 15 to PGA block 10. PGA block 10 can then manipulate the pixel data. PGA block 10 can cause the resulting pixel data to be written back into RAM 15 by writing an appropriate DMA command into the control store. The DMA state machine executes the DMA command, thereby retrieving the pixel data from PGA block 10 and places it back into RAM 15 at a location identified by the DMA command. Although a DMA technique is set forth here by which PGA block 10 can access pixel data in RAM 15, other techniques for giving PGA block 10 access to this pixel data can be employed. Accordingly, various modifications, adaptations, and combinations of various features of the described embodiments can be practiced without departing from the scope of the invention as set forth in the following claims.

What is claimed is:

1. An apparatus, comprising:
a segment buffer that stores pixels of video information, wherein the pixels of video information include a first set of pixels and a second set of pixels, and wherein the segment buffer has a maximum pixel storing capacity; and
an interpolator mechanism that receives the pixels of video information from the segment buffer and generates therefrom an interline gap pixel, wherein the first set of pixels is written into the segment buffer at the same time as the interplator mechanism receives the second set of pixels from the segment buffer and generates therefrom the interline gap pixel.

2. The apparatus of claim 1, wherein the interpolator mechanism uses some but not all of the pixels of video information stored in the segment buffer to interpolate the interline gap pixel, and wherein the pixels of video information that are not used in the interpolation of the interline gap pixel are overwritten with the first set of pixels.

3. The apparatus of claim 1, wherein the segment buffer stores a plurality A of line segments, wherein each line segment includes B pixels, wherein the maximum pixel storing capacity of the segment buffer is A times B, wherein the segment buffer is written with successive A by B pixel segments, and wherein each of the pixel segments overlaps another of the pixel segments such that each such pair of overlapping pixel segments shares a plurality of pixels of video information.

4. The apparatus of claim 3, wherein each pixel segment comprises a plurality of pixel blocks, wherein the interpolator mechanism determines whether each of the pixel blocks exhibits a motion characteristic, and wherein if a pixel block is determined to exhibit the motion characteristic then a first type of interpolation is used to generate interline gap pixels for the block, and wherein if the pixel block is determined not to exhibit the motion characteristic then a second type of interpolation is used to generate the interline gap pixels for the pixel block.

5. The apparatus of claim 4, wherein the interpolator mechanism comprises a motion history buffer, the motion history buffer comprising a plurality of motion history bits, each motion history bit being indicative of whether a corresponding pixel block exhibits the motion characteristic.

6. The apparatus of claim 3, further comprising:
a memory that stores a field of pixels, the field including a plurality C of lines of pixels, wherein each of said lines includes D pixels, wherein each of the plurality A of line segments stored in the segment buffer is a segment of a different line of the field of pixels, and wherein A is less than C and wherein B is less than D.

7. The apparatus of claim 1, further comprising:
a memory controller that retrieves pixels from a memory and writes the retrieved pixels into the segment buffer.

8. The apparatus of claim 7, further comprising:
a programmable logic portion coupled to the memory controller, wherein the programmable logic portion is programmed to implement a video enhancement algorithm.

9. The apparatus of claim 1, further comprising:
a memory that stores a field of pixels, a second field of pixels and a third field of pixels, wherein the field of pixels is a field of interest, wherein the second field of pixels precedes the field of interest, and wherein the third field of pixels follows the field of interest;
a second segment buffer through which pixels of the second field are passed to the the interpolator mechanism; and
a third segment buffer through which pixels of the third field are passed to the interpolator mechanism.

10. The apparatus of claim 1, wherein the segment buffer and the interpolator mechanism are part of a television.

11. The apparatus of claim 1, wherein the segment buffer and the interpolator mechanism are part of a display processor portion, further comprising:
a programmable logic portion coupled to the display processor portion, the programmable logic portion being programmed to implement a video enhancement algorithm.

12. The apparatus of claim 11, wherein the display processor portion and the programmable logic portion are on a single integrated circuit.

13. An apparatus, comprising:
a memory that stores pixels of video information;
an interpolator mechanism that receives the pixels of video information and generates therefrom interline gap pixels; and
means for overwriting just-used but no longer needed pixels with new pixels at the same time that other pixels are being received by the interpolator mechanism and used to generate the interline gap pixels.

14. The apparatus of claim 13, wherein the means comprises a dual-port memory.

15. The apparatus of claim 13, wherein the means receives successive pixel segments from the memory, and wherein each of the pixel segments overlaps another of the pixel segments such that each such pair of overlapping pixel segments shares a plurality of pixels.

16. The apparatus of claim 13, wherein the interpolator mechanism receives pixel blocks from the means, wherein the interpolator mechanism determines whether each of the pixel blocks exhibits a motion characteristic, and wherein if a pixel block is determined to exhibit the motion characteristic then a first type of interpolation is used to generate interline gap pixels for the pixel block, and wherein if the pixel block is determined not to exhibit the motion characteristic then a second type of interpolation is used to generate the interline gap pixels for the pixel block.

17. The apparatus of claim 13, wherein the interpolator mechanism comprises a motion history buffer, the motion history buffer comprising a plurality of motion history bits, each motion history bit being indicative of whether a corresponding pixel block exhibits the motion characteristic.

18. The apparatus of claim 13, further comprising:
a memory controller that retrieves pixels from the memory and that writes the retrieved pixels into the means.

19. The apparatus of claim 18, wherein the interpolator mechanism and the memory controller are part of a display processor portion, further comprising:
a programmable logic portion coupled to the display processor portion, the programmable logic portion being programmed to implement a video enhancement algorithm.

20. The apparatus of claim 19, wherein the display processor portion and the programmable logic portion are on a single integrated circuit.

* * * * *